(12) United States Patent
Radl

(10) Patent No.: US 9,058,029 B2
(45) Date of Patent: Jun. 16, 2015

(54) SYSTEM AND METHOD FOR CREATING A GRAPHICAL CONTROL PROGRAMMING ENVIRONMENT

(76) Inventor: Brad Radl, Chardon, OH (US)

(*) Notice: Subject to any disclaimer, the term of this patent is extended or adjusted under 35 U.S.C. 154(b) by 152 days.

(21) Appl. No.: 13/076,954

(22) Filed: Mar. 31, 2011

(65) Prior Publication Data

US 2012/0253479 A1 Oct. 4, 2012

(51) Int. Cl.
| | |
|---|---|
| G05B 11/01 | (2006.01) |
| G06F 19/00 | (2011.01) |
| G01N 31/00 | (2006.01) |
| G06G 7/48 | (2006.01) |
| G05B 19/042 | (2006.01) |
| G06F 9/44 | (2006.01) |

(52) U.S. Cl.
CPC .... G05B 19/042 (2013.01); G05B 2219/23258 (2013.01); G06F 8/34 (2013.01)

(58) Field of Classification Search
USPC ............ 700/12, 18, 34, 103, 130; 702/25, 30, 702/31; 703/12
See application file for complete search history.

(56) References Cited

U.S. PATENT DOCUMENTS

| | | | | |
|---|---|---|---|---|
| 3,866,109 A | * | 2/1975 | Reed et al. | 322/15 |
| 3,875,384 A | * | 4/1975 | Davis | 700/82 |
| 3,898,441 A | * | 8/1975 | Davis et al. | 700/287 |
| 3,991,557 A | * | 11/1976 | Donath | 60/776 |
| 4,015,548 A | * | 4/1977 | Schuss | 110/101 C |
| 4,115,848 A | * | 9/1978 | Kogure et al. | 700/34 |
| 4,115,861 A | * | 9/1978 | Allington | 700/18 |
| 4,119,061 A | * | 10/1978 | Hoshi et al. | 123/3 |
| 4,125,091 A | * | 11/1978 | Hori et al. | 123/3 |
| 4,156,798 A | * | 5/1979 | Doelz | 700/4 |
| 4,356,546 A | * | 10/1982 | Whiteside et al. | 714/10 |
| 4,473,537 A | * | 9/1984 | Ford et al. | 423/239.1 |
| 4,628,434 A | * | 12/1986 | Tashiro et al. | 706/45 |
| 4,707,778 A | * | 11/1987 | Yamada et al. | 700/3 |
| 4,740,886 A | * | 4/1988 | Tanifuji et al. | 700/30 |
| 4,827,394 A | * | 5/1989 | Wanner | 700/9 |
| 4,907,166 A | * | 3/1990 | Corenman et al. | 702/30 |
| 4,912,624 A | * | 3/1990 | Harth et al. | 700/36 |

(Continued)

FOREIGN PATENT DOCUMENTS

EP 764614 A2 * 3/1997 ............... C04B 7/43

OTHER PUBLICATIONS

Chung et al., "An Alert Management System for Concrete Batching Plant" IEEE, 2007, p. 591-598.*

(Continued)

*Primary Examiner* — Sean Shechtman
*Assistant Examiner* — Thomas Stevens
(74) *Attorney, Agent, or Firm* — Clifford Kraft

(57) ABSTRACT

A system and method for generating modeling software for processing control, used in power plant control, cement plants or other industrial control applications, using models such as expert systems, fuzzy logic, genetic optimization algorithms, and neural networks to convert sensor data into actionable data, information and/or diagnostics. The present invention includes a graphical programming environment, graphical programming tools, graphical user interface (GUI), visual feedback, real-time refresh, run-time object swap, logic standby (safety recovery), modeling and optimization to allows a user to create a control system for an industrial process, and that allows the user to change the process without any manual compile, assemble or load steps other than a save and refresh pushbutton.

18 Claims, 13 Drawing Sheets

(56) References Cited

U.S. PATENT DOCUMENTS

| | | | |
|---|---|---|---|
| 4,975,865 A * | 12/1990 | Carrette et al. | 700/10 |
| 5,067,099 A * | 11/1991 | McCown et al. | 702/183 |
| 5,103,629 A * | 4/1992 | Mumford et al. | 60/778 |
| 5,157,736 A * | 10/1992 | Boyer et al. | 382/113 |
| 5,181,482 A * | 1/1993 | Labbe et al. | 122/392 |
| 5,216,612 A * | 6/1993 | Cornett et al. | 700/96 |
| 5,280,701 A * | 1/1994 | Tolman | 60/772 |
| 5,315,521 A * | 5/1994 | Hanson et al. | 700/103 |
| 5,377,627 A * | 1/1995 | Andersson | 122/4 D |
| 5,457,792 A * | 10/1995 | Virgil et al. | 1/1 |
| 5,497,498 A * | 3/1996 | Taylor | 710/104 |
| 5,585,552 A * | 12/1996 | Heuston et al. | 73/114.73 |
| 5,799,268 A * | 8/1998 | Boguraev | 704/9 |
| 6,018,797 A * | 1/2000 | Schmidt et al. | 712/42 |
| 6,102,958 A * | 8/2000 | Meystel et al. | 703/2 |
| 6,128,588 A * | 10/2000 | Chacon | 703/6 |
| 6,168,709 B1 * | 1/2001 | Etter | 208/131 |
| 6,240,091 B1 * | 5/2001 | Ginzboorg et al. | 370/401 |
| 6,268,853 B1 * | 7/2001 | Hoskins et al. | 700/83 |
| 6,351,703 B1 * | 2/2002 | Avery, Jr. | 701/112 |
| 6,827,023 B2 * | 12/2004 | Katzer | 105/1.5 |
| 6,853,930 B2 * | 2/2005 | Hayashi et al. | 702/61 |
| 6,895,875 B1 * | 5/2005 | Lissianski et al. | 110/345 |
| 6,978,726 B2 * | 12/2005 | Kobayashi et al. | 110/347 |
| 7,398,652 B1 * | 7/2008 | Kosvic et al. | 60/664 |
| 7,647,204 B2 * | 1/2010 | Hanson et al. | 702/182 |
| 7,779,119 B2 * | 8/2010 | Ginter et al. | 709/224 |
| 8,079,335 B2 * | 12/2011 | Rollinger et al. | 123/90.17 |
| 8,210,200 B2 * | 7/2012 | Salmento | 137/495 |
| 8,261,202 B2 * | 9/2012 | Dunn | 715/764 |
| 8,281,265 B2 * | 10/2012 | Vorbach et al. | 716/100 |
| 8,296,070 B2 * | 10/2012 | Paxson et al. | 702/19 |
| 2002/0002414 A1 * | 1/2002 | Hsiung et al. | 700/95 |
| 2002/0016685 A1 * | 2/2002 | Takano et al. | 702/30 |
| 2002/0179493 A1 * | 12/2002 | Etter | 208/131 |
| 2003/0111531 A1 * | 6/2003 | Williams | 235/383 |
| 2003/0143128 A1 * | 7/2003 | Lanier et al. | 422/171 |
| 2003/0150909 A1 * | 8/2003 | Markham et al. | 235/376 |
| 2003/0154144 A1 * | 8/2003 | Pokorny et al. | 705/28 |
| 2004/0011051 A1 * | 1/2004 | Ryan et al. | 60/773 |
| 2004/0074427 A1 * | 4/2004 | Kobayashi et al. | 110/347 |
| 2004/0107700 A1 * | 6/2004 | McClanahan et al. | 60/670 |
| 2004/0128027 A1 * | 7/2004 | Groll et al. | 700/245 |
| 2004/0199831 A1 * | 10/2004 | Shibata et al. | 714/47 |
| 2005/0021567 A1 * | 1/2005 | Holenstein et al. | 707/200 |
| 2005/0267709 A1 * | 12/2005 | Heavner et al. | 702/183 |
| 2006/0032788 A1 * | 2/2006 | Etter | 208/131 |
| 2006/0141407 A1 * | 6/2006 | Neary | 431/2 |
| 2006/0178762 A1 * | 8/2006 | Wroblewski et al. | 700/30 |
| 2007/0180835 A1 * | 8/2007 | Zauderer | 60/900 |
| 2007/0250125 A1 * | 10/2007 | Lindh et al. | 607/9 |
| 2007/0250215 A1 * | 10/2007 | Jia et al. | 700/274 |
| 2008/0082194 A1 * | 4/2008 | Samardzija et al. | 700/109 |
| 2008/0082302 A1 * | 4/2008 | Samardzija et al. | 703/2 |
| 2008/0109205 A1 * | 5/2008 | Nasle | 703/18 |
| 2009/0012653 A1 * | 1/2009 | Cheng et al. | 700/287 |
| 2009/0112909 A1 * | 4/2009 | Chancey et al. | 707/102 |
| 2009/0222249 A1 * | 9/2009 | Wang et al. | 703/13 |
| 2009/0317320 A1 * | 12/2009 | Srinivasachar et al. | 423/460 |
| 2009/0319060 A1 * | 12/2009 | Wojsznis et al. | 700/30 |
| 2010/0031821 A1 * | 2/2010 | Jepsen et al. | 95/273 |
| 2010/0071889 A1 * | 3/2010 | Radl | 165/286 |
| 2010/0288228 A1 * | 11/2010 | Puschnik et al. | 123/306 |
| 2011/0185027 A1 * | 7/2011 | Pearson et al. | 709/206 |

OTHER PUBLICATIONS

"Griffin Open System" brochure, Jan. 21, 2011, 5 pages.*

* cited by examiner

| Applications | | | | X |
|---|---|---|---|---|
| File  Edit  Control  View | | | | |

| Name | Status | Auto | Ret. | Priority |
|---|---|---|---|---|
| Compound Model retrainer wDSV | Running (4044) | | 0 | Low |
| Compound Model retrainer sDSV 9 30 | Stopped | | 0 | Below Normal |
| Compound Model retrainer wDSV 9 30 site 10 14backup | Stopped | | 0 | Normal |
| demo of custom model | Stopped | | 0 | Above Normal |
| DSV | Stopped | | 0 | High |
| Function Example | Stopped | | 0 | Normal |

FIG. 5

| | |
|---|---|
| Name: | |
| Description: | |
| Type: | Neural Network |
| | Neural Network |
| Num. Inputs: | Compound Neural Network |
| | Nonlinear Regression |
| Num. Outputs: | Custom Model |
| | Hybrid Model |

OK  Cancel

FIG. 7

| Link Type: | PI ▼ |
| --- | --- |
| | PI |
| | OPC |
| | File |

FIG. 9

SYSTEM AND METHOD FOR CREATING A GRAPHICAL CONTROL PROGRAMMING ENVIRONMENT

BACKGROUND

1. Field of the Invention

The present invention relates generally to a system and method for building advanced and supervisory control systems using a graphical programming environment, and in particular a system for processing information and using models, expert type logic, genetic algorithms and optimization algorithms to convert sensor data into actionable data, information, and/or diagnostics.

2. Description of the Prior Art

Computing technology is continuing to advance at a rapid pace, permitting more powerful algorithms and complex strategies to be implemented to efficiently run a control process or businesses. Increasingly, the shift of automation is from mundane repetitive tasks to those of high order complexity that are simplified by human operators to achieve rapid response. The increasingly complex tasks can be automated to assist, complement or take direct control over industrial processes and business operation which before could only be manually adjusted.

Traditionally automation was done through text-based programming languages such a Java, C, C++, Visual Basic, ADA and the like. These programming languages require a defined set of commands that then require compilation in a machine readable code that can be execute by a computer. Once complied, they cannot be changed without a total recompile and load.

Text based programming can occur at many levels and is often referred to as an art, as much as a science. Experienced users with knowledge of computer operations, and nuances associated with lower level code closer to the machine readable code and the physical system, are increasingly in short supply. Yet, for many of today's applications, it would be advantageous to have this knowledge and ability to better utilize computer resources in creating automation solutions that involve data processing, models, diagnostics and optimization.

The automation of process control involves both continuous processes (like heating water) and discrete processes (like turning a motor on/off). Generally, this involves using input data to determine the controllers' reaction to achieve a goal or output. Input data may come directly from sensors or manual inputs, or be pre-processed in some form and collected from data bases, software programs, memories or registers in hardware. There may be other abstracted forms of moving and transforming raw data into the desired information as well. The goal may be direct such as controlling a temperature, pressure, flow, specific octane content, making motor active, initiating a trade or the like, or the goal may abstract such as maximizing profit or extending the life of equipment.

Process control therefore requires the representation and movement of data or information, a model of the data, and a way to evaluate the success of achieving the goal or objective. With more complex process control, the latter is often termed optimization. Process control can represent control of a physical process or an abstracted process like a business process. Modeling and optimization tend to be resource intensive, and the more advanced the programmer, generally the more efficient the operation of the code.

One of the challenges is that often the control process is changing, or evolving, being modified or is otherwise dynamic. Also, many states may exist in the process space that are rarely visited or not previously encountered (or anticipated). It would be advantageous to have a system and method to build models and optimizers that can access or control a wide range of states and achieve close to a truly optimized target.

Many engineers, traders, operations people, and other skilled professionals have a large base of knowledge that they apply heuristically to achieve results. It would be advantageous to encode or program this knowledge into automation systems, but this tends to be expensive, involving layers of people to get the knowledge from the 'knower's head' to a program such as an expert system, where it can be tested. This may take several feedback loops among users and programmers to achieve a result.

It would be advantageous to have a graphical programming environment with run-time feedback and meta-programming capability. The ability to alter code on the fly without a total re-compile would provide a way to quickly implement automation and interrogation solutions not previously cost effective to implement. Such a graphical user interface would permit load balancing, prioritization, cloud computing, divergent computing, usage of GPUs, PPUs, and other methods that distribute or manage the load on computers or controllers. Additionally, the interface and tools would integrate easily into web usage, e-mail capability or other electronic means of communication.

SUMMARY OF THE INVENTION

The present invention relates a system and method for generating modeling software for processing control, such as power plant control or other industrial control, using models such as expert systems, fuzzy logic, genetic optimization algorithms, and neural networks to convert sensor data into actionable data, information and/or diagnostics. The present invention includes a graphical programming environment, graphical programming tools, graphical user interface (GUI), visual feedback, real-time refresh, run-time object swap, logic standby (safety recovery), modeling and optimization to allows a user to create a control system for an industrial process, and that allows the user to change the process without any manual compile, assemble or load steps other than a save and refresh pushbutton.

The present invention may be applied to a wide range of physical processes and information processing systems, particularly when used in conjunction with modeling, diagnostics and optimization. It may be applied off-line for simulation, or on-line to immediately impact a system. In particular, it may be directly tied or connected to an industrial process such as a power plant to provide a dynamic control environment.

The present invention eliminates the need for a programmer, and allows a user, maybe an expert, to directly implement logic, models, optimizations, and the like into a program readily modified, tested, changeable and adopted for use. The final control programs and tools so developed can be implemented in real-time actionable data solutions (such as direct control) and for off-line data analysis, what-if scenarios, optimization scenarios and other common tasks of interrogating data.

DESCRIPTION OF THE FIGURES

Attention is now directed to several drawings that illustrate features of the present invention:

FIG. 5 shows a listing of defined applications.

FIG. 7 shows available model types in a particular embodiment of the invention that may be used in an application.

FIG. 9 shows a box allowing the user to select the source of data used in the application and the output format used for control.

Figure 1:
FIG. 1 shows a control box that allows opening of a thread.

Several drawings and illustrations have been presented to aid in understanding the present invention. The scope of the present invention is not limited to what is shown in the figures.

DESCRIPTION OF THE INVENTION

The present invention relates to graphical-based programming that permits creation of control models, optimizers, logic, expert logic, fuzzy logic, processing logic, data manipulation, data handling, data processing, toolbars, customized user interfaces, distributed processing of applications and routines as well as cloud enabled applications and routines. The present invention enables users to change logic and evaluate the impact on the next scheduled (time or trigger based) execution of that change in logic. The system accommodates the use of external code of any type with incorporation of this code into a system utilizing objects in a system designed for object serialization and reflection.

Prior art systems have numerous limitations known in the art, and because of these limitations, various graphical programming environments now exist which allow a user to construct a graphical program or graphical diagram. Often these are termed as block diagrams. Graphical programming environments are considered an abstraction above text-based languages. The graphical programming environment of the present invention does not require learning of syntax and structure, and hence tends to be more intuitive, requiring little, if any, special training.

The user typically creates a graphical program by pointing and clicking, dragging and dropping, or other simple operations to bring an element or block into the graphics area for use by the program under development. These elements may be interconnected having separate execution frequencies, trigger based operation, interaction with other programs, databases, read/write files or any other operation that is permitted by standard text based programming environments. The elements typically, though not always, will usually have pop up dialogue boxes that prompt users to enter data or work with default data.

The elements are typically connected by lines indicating a desired logic flow. These lines may themselves be objects which permit them to display whether they are active, inactive, or have some other state (such as being color coded to reflect number of operations in the 1000 cycles of the program). Not all elements need be embedded in this logic flow.

For example, objects that permit real-time data to be stored, trended, modified by users in an operator or other type of user interface screens may only need be defined to save or process the data to support those interfaces. These customized user interfaces can either be separate programs or built from the system of the present invention itself.

Typically, in the past, the program would be compiled for run time execution. Most if not all, visual programming environments require compilation. Newer methods use interpreters or virtual machines. This system implementation abstracts to a higher level, is generally through the conversion of the graphical environment into a virtual machine, without compilation, linkers or other steps to convert the program to a usable format.

In the graphical programming environment (GPE) of the present invention, the user may enter data or otherwise interact with the system through wizards, dialog boxes, properties menus, other programs, etc. whether locally or remotely located. Steps often involve simple point and click, or click and drag operations. The user has control over many different phases of program operation. A set of instructions, logic, models, optimizers and other items that may be executed need to be attached to a triggering event. Within a program or group of programs, this typically includes timer, or triggering event (1). An element in the graphical programming environment can be used to identify this start to a program. In addition, the more sophisticated programs will allow a priority to be attached to the individual applications. These may be embedded in an element description or setup through menus, predefined entry screens, from other programs, calculated data pointers, user input, etc. (2) Additionally, the user may specify if the program, task, or application is to remain local or may have its computations done remotely over other computers, or other processing units, such as, GPU's (graphics processing units), GPGPU's (General Purpose Graphics Processing Units, sometimes also called $GP^2$).

The implementation of the present invention also has a particular interest in physics processing units (PPU's) designed to handle the calculations of physics. In particular, the latter is beneficial to modeling and optimization of process, especially the more complex processes, including but not limited to, fluid dynamics, steam properties, rigid and soft body dynamics, thermal aging, gas properties, power dynamics, etc. While GPU's and PPU's were originally designed for creating realistic simulations in gaming environments, they are readily usable for distributing calculations of real world tools. Ultimately, the user ends up with some combination of program(s), model(s), optimizers(s), etc. that perform a task and may interact with each other. Each may interact with the other in such a fashion that they modify the behavior of another program(s), model(s), optimizers(s), etc. These programs/task created efficiently and flexibly without a need for compilation or linking of code.

Many different existing tools can be used for structuring the GPE. For example, it may be broken into functional areas for a run-time modeling and optimization system such as is done by the system provided by Griffin Open Systems® for example. The structuring tool may encompass an application builder, a model builder and data link builder. Each would then have its own environment for building an application or a component of a larger application.

With the GPE, program flows need not be linear, with elements possibility having one or more inputs, one or more outputs that may involve a jump to another program; jump to other elements, program stops, program holds; different program delays, and execution of any number of sub-programs. The elements themselves may represent any set of definable actions, whether for program logic, control logic, application logic, gating logic, PLC logic, models, optimizers, trainers, data cleaners, physical variables (such as enthalpy, entropy, flow coefficients) and the like. Many different toolbars may be created that can be customized for a particular application environment which would be composed of elements representing a common action for the field of application. One object of the present invention is to retain an intuitive feel for the system.

The GPE may have the feature of active feedback upon executing logic. When active, the connecting logic may change color (or other indication) reflecting a state of operation. In a particular example, the connecting logic could have one color when active and another color when inactive providing a user with real-time feedback on which logic is active. The GPE may display the values at one, some, or all elements in the work environment, including array elements, matrix elements thus providing the user real-time feedback on the values in the system. The values may be either the current instantaneous value or the value after the complete execution of some defined portion of the logic. More complex feedback schemes can be implemented reflecting other types of program diagnostic information, including but not limited to, execution frequency, intermediate results, quality of variables, and the like.

The use of real-time feedback in a GPE can be combined with real-time tuning features permitting active development, without ever requiring a program compile, or even a program interruption. Namely, once the user has defined at least one sequence number and a corresponding or default execution frequency, the user may start the program and then build the program one element at a time, viewing the active result either instantaneously (within limits of the CPU speed) or after each program cycle, depending on the system setup. In this embodiment, the user would simply add the element to the design area and click on a save or refresh type operation to make the logic active. As a particular control system in the field has been tested over a 90 day period programming in this manner creating 1000+ element system controlling 32 output parameters that are sent through an OPC data server and finally to a digital control system (DCS) permitting tuning not possible before without man-years of effort.

A GPE of the present invention may be a stand-alone application or part of a large system of applications. GPE applications can share data through a common data space or through a plurality of data bases. GPE applications can signal, trigger, or otherwise be designed to impact the operation of another application, including such parameters as priorities CPU, GPU, $GP^2$, and PPU utilization (any specialized processing unit), load sharing, load shedding, distribution of computations, including but not limited to GPE apps that model and optimize the distribution and execution of GPE and other applications. A GPE element may itself be defined through, or as a combination of, other GPE elements. In this manner; it could interact with another GPE application through either data flow in the program, and/or data objects, and/or objects, and/or through a shared data space in a computer, or through other data bases.

As the above example shows, the usage includes the potentially active control in addition to any off-line or indirect control applications. Accordingly, the embodiment anticipates that normally the system will have back-up and fast recovery options. These methods include automatic archiving of the logic with one or more copies maintained. The archiving may be triggered through a number of one or more changes such as, but not limited to, timers, elements, change of state, significant change, or other user definable parameter.

As a particular example, when using a timer, the timer could normally be adjustable so that it may correspond to the period of the process being monitored, controlled or otherwise interacted with.

Additional safety features take the form of snapshots or standby logic. These could take several forms. In the first form, there can be two separate archives. One captures the GPE element layout logic; the other includes all the values in memory including intermediate values of calculations, states or control actions. If only the GPE layout is recalled, the user would need to wait an execution cycle for values to be recalculated. If the GPE layout and the intermediate values are recalled (restored), the environment would snap to those stored parameters thereby quickly restoring the system to its operation before the last change. In the second form, the user initiates the snapshot of the desired operation before making a change with the GPE logic. Should the user want to snap back to the last state, there can be a simple recovery option, for example, an icon to click on, a function key, or other input indication. Additional embodiments of this feature include automate return to state without user intervention; return to state based on a parameter, and the like.

The GPE layout may be created in a plurality of ways, though usually this involves drag and drop, click and plop, or other actions that usually can be accomplished by use of a mouse or other input device, in associated with function keys, or other simplified steps to place element in a work space and then logically connecting the elements. The connections are either made through use of the mouse to effectively draw an object between them, or by expanding a box (or other enclosed object) and clicking or otherwise initiating an action to connect the object with the box (or other enclosing object). Elements are normally available for standard editing and linked functions, such as, cut, paste, delete, undelete, copy, alignment, paging, wizards, contextual help, menus, text boxes, drawing wizards, and the like.

Some additional enhancements in the GPE may aid in organization of the logic. These include but are not limited to; an alignment tool whereby a user may effectively draw a box (or other enclosing object) with the mouse and then click or otherwise initiate an action to cause the connection among the enclosed elements to align themselves generally reducing or eliminating joints, bends, or other unnecessarily clutter.

The GPE may have any number of application modules, sub-sections, tasks, programs, subroutines that support automation. One example is a model building toolkit. Here, the resulting elements are usually graphical blocks, but the setting up of the model can be accomplished through a series of menus with associated dialog boxes or wizards or helpful hints and other contextual help mechanisms. The models so generated are useful in an of themselves and therefore have there own interrogation means for exploring the developed models. Examples include, but not limited to, three-dimensional graphs, three-dimensional graphs with display through time (4D), what-if capabilities, best match, optimization, correlations indexes, r2 values, directional change correlations indexes (DCC).

The GPE system may have a tool for importing and exporting data. Data may be imported and exported outside the computer, within the computer, within application, among GPE applications and the like. When dealing with end-use devices such as digital control system, there many intervening OPC servers, PI data servers, xx servers, or other ways to transfer to and from the final device or actionable component (such as to execute a trade). The data may be set up through menu driven interfaces, or wizards in conjunction with, separate from or embedded in the GUI.

The system can be open set up as open architecture; namely, the GPE has mechanisms for users to install their own programs and methods into the GPE system where they can be used as is, or can become additional elements in the GPE. There is no language restriction, though the user must be able to provide the program or method either as a callable object or an object that can be embedded into the GPE.

The GPE provides a standard application program interface (API) to plug in any custom blocks or model. Even though, the API may be in Java™, with Java Native Interface (JNI), any module in any language can be plugged into the environment. A graphical based programming toolkit, which is a graphical programming environment (GPE), for developing applications to control a power plant, power grid, power trading or diagnostics for any of the components within the power plant. The toolkit allows non programmers to develop logic, involving traditional if, then, when (and other expert system like logic) conditions and combine them with models and optimizers for: tuning a power plant operations, the distribution of power, power flow, power pricing. The models in turn may be used to diagnose conditions in particular equipment, leading equipment to be automatically bypassed or turn-off. The programming toolkit may connect directly to a DCS or through data bases such as OPC servers or an industry data base as offered by OSI PI. The communication may allow the altering of any number of parameters in a control system, (e.g. a DCS or PLC system), including, actual control setting, bias to a control setting, gain, gain adjustments, ramp rates, On/Off, quality status, and the like In one possible embodiment, a user may use the GPE to model a combustion process in a power plant, reading in values of air and fuel flow, along with reading for temperature and pressure for the combustion gases and water/steam points, it may use a model component to train a model the resulting Heat Rate, NOx and CO emissions, Loss of Ignition (LOI), Carbon in Ash (CIA), heat profile, Hg species, gas distribution profile (for any parameter modeled). The model may be constrained by Min/Max values calculated by the GPE using logic set up by an engineer. Goals may be entered by the user, fed in from the control system or dynamically calculated by the GPE. These goals in turn would feed an optimizer element the user selects in the GPE to determine the optimum control settings. The GPE then either directly communicates with the DCS through a link potentially set up in the GPE or possibly through an OPC data base connected to the DCS. In the simplest example, the OPC then passes on the GPE determined set points.

Because the GPE does not have limits on number of simultaneous applications, it allows a hierarchy of applications to be build. For example, it may have models for optimizing the settings on the mills grinding the coal, for belts blending coal, for distribution of ammonia to a Selective Catalytic Converter (SCR), adjusting pumps on/off for a Flue Gas Desulfurization (FGD) system, and the power setting on a precipitator. Each of the applications may communicate results and data with each other either in parallel or up or down the optimization chain, for the purpose of achieving the overall plant operation goals. Several different control systems may be involved. For example, the fuel yard may have programmable logic controllers (PLCs), the combustion process a DCS, and the FGD another set of PLCs. All of these could be controlled by the GPE in a user configured application.

Turning to the figures, several examples of the GPE of the present invention can be seen.

FIG. 1 shows a GPE window that allows a user to define a starting thread and the order in which that thread starts when there are multiple threads in an application.

Figure 2:
FIG. 2 shows identifying a thread to associate any logic that follows.

FIG. 2 identifies a thread to associate with any logic that follows the arrow. One can have the equivalent of multiple programs and frequencies within the same control application using this feature.

Figure 3:
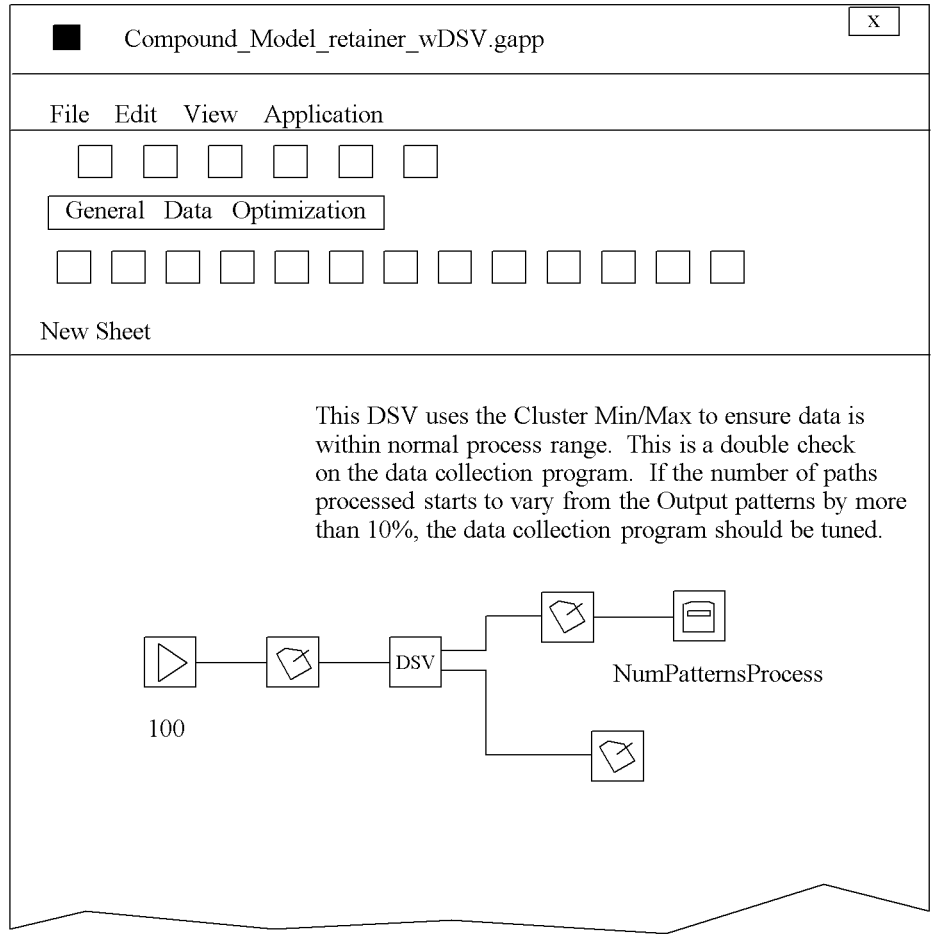
FIG. 3 shows sample logic for use with a DSV block that sorts incoming data for range checks, quality, and other constraints, before it is based to other processing elements with the control application.

FIG. 3 shows sample logic with the use of a DSV block that sorts incoming data for range checks, quality, and other constraints before it is sent to other processing elements with the control application. FIG. 3 shows how the logic is connected after a thread is established.

Figure 4:
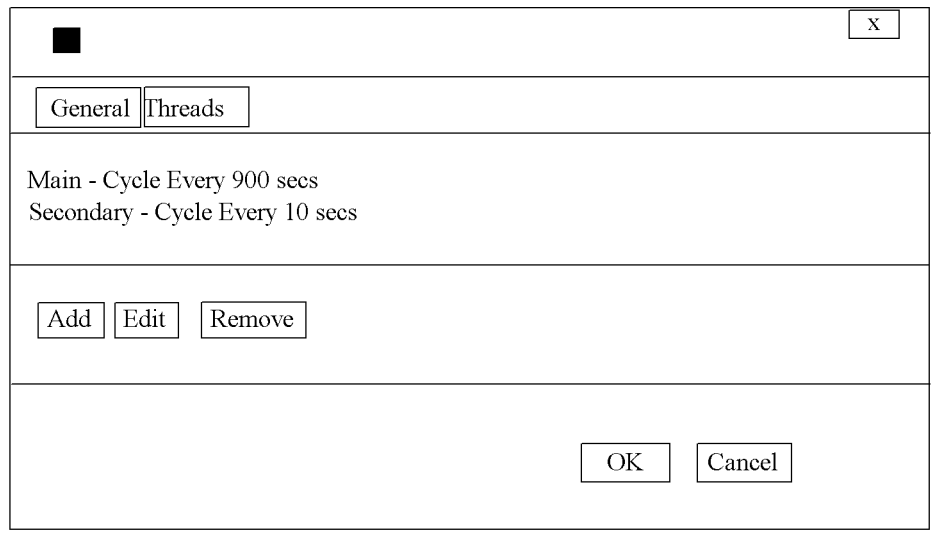
FIG. 4 shows how threads are defined.

FIG. 4 shows how threads are defined. There is no limit on number of threads except that imposed by the underlying computing hardware platform.

FIG. 5 shows a listing of defined applications in a particular embodiment of the invention. The control action can be stopped or started by the user. Priority of computer resources are chosen by the user, so a key real-time control action can have precedence over a lower level tuning action. The thread assignment is typically displayed when running. Running applications are shown in red in FIG. 5, while inactive ones are shown in white.

Figure 6:
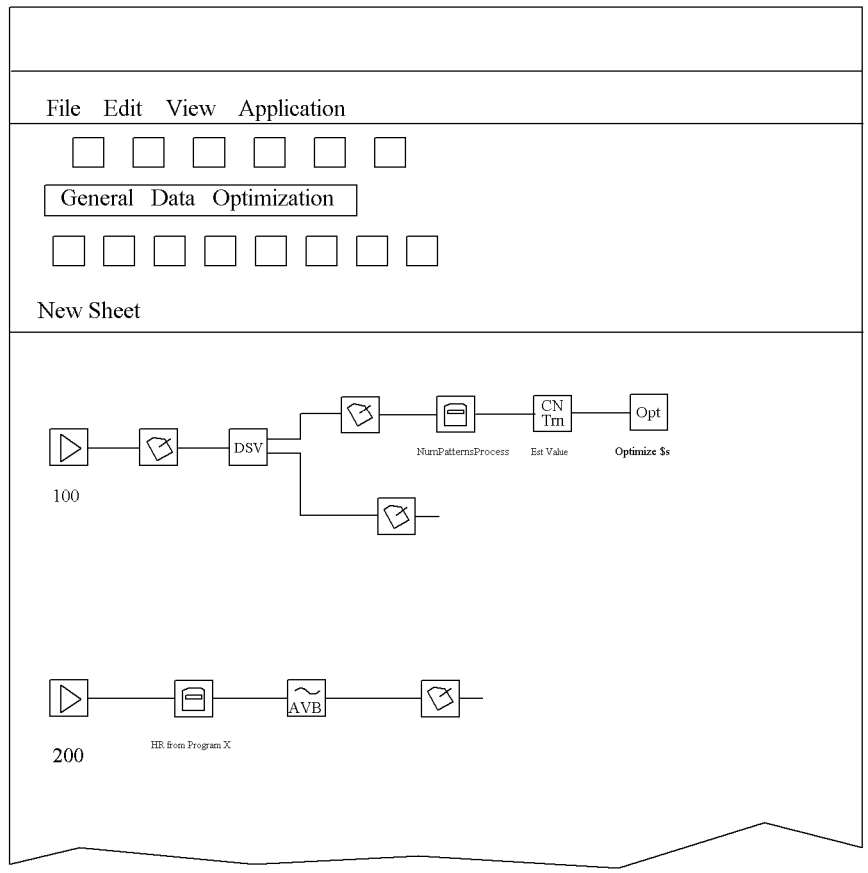
FIG. 6 is an example of multiple logic streams.

FIG. 6 is an example of multiple logic streams.

FIG. 7 shows available model types in a particular embodiment that may be used in an application.

Figure 8:
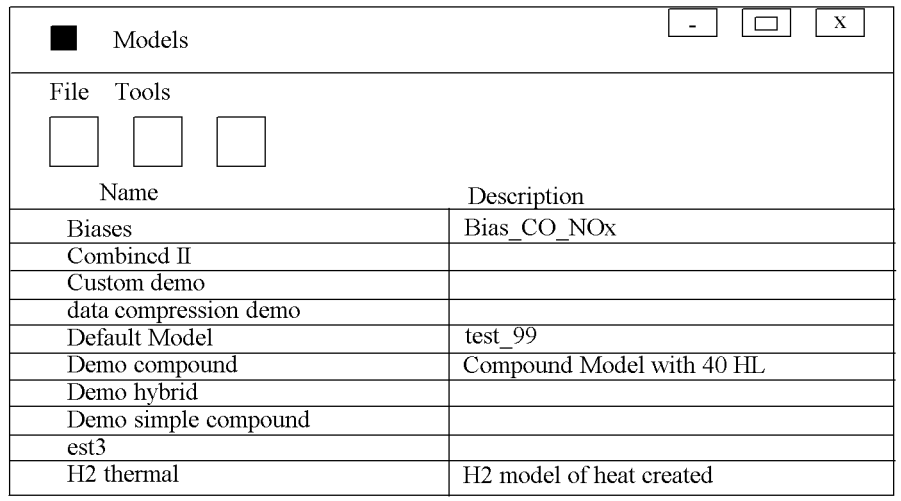
FIG. 8 is a summary of models defined within an embodiment of the present invention.

FIG. 8 shows a summary of models defined within the embodiment of FIG. 7. Models can be any combination of the types shown in FIG. 7.

FIG. 9 is a window that allows the user to select the source of data used in the application and the output format used for control.

Figure 10:
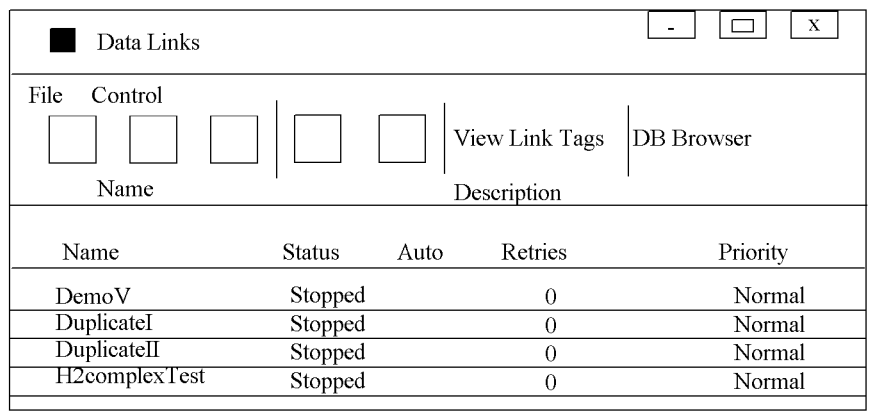
FIG. 10 is a data link summary that permits any number and type of data links to be defined and used.

FIG. 10 shows an example of Data Link Summary which permits any number and type of data links to be defined and used. For example, DemoV may be flat ASCII file, Duplicate I a PI data file and used as inputs into the application, while H2 complexTest may be an OPC type controlling bias setting in the PLC, for example controlling the H2 pressure and H2 purity in a power plant generator.

Figure 11:
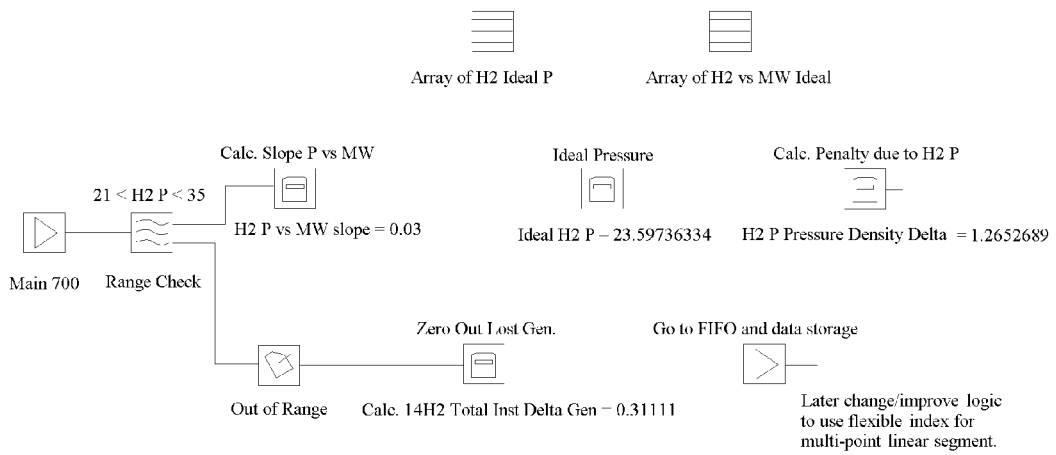
FIG. 11 shows a box that permits display of active logic and values.

FIG. 11 shows a display of active logic and values. The red line shows the last logic activated in the last execution cycle. Each execution cycle, data is checked, and if the save/refresh cycle is activated, logic is updated and reflected in the real-time display screen above.

Figure 12:
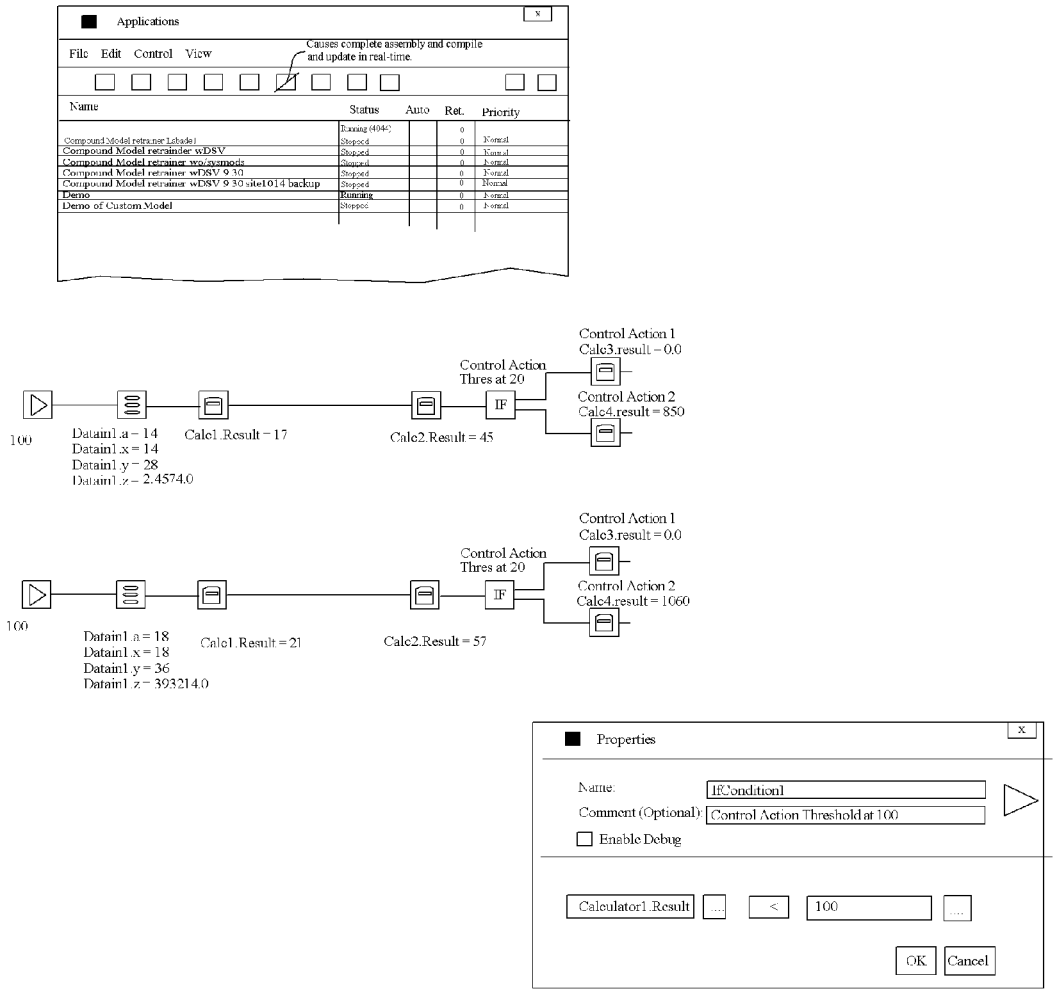
FIG. 12 shows a refresh operation.

FIG. 12 shows one of the major features of the present invention. After saving a file, pressing the refresh button updates all logic and calculated values, which on the next scheduled execution cycle updates the control system, changing the process setpoints and biases or other control parameters (e.g. including control loop tuning parameters).

Figure 13:
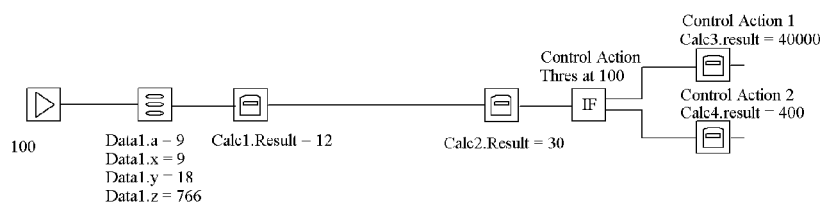
FIG. 13 shows a snapshot feature.
Figure 13:
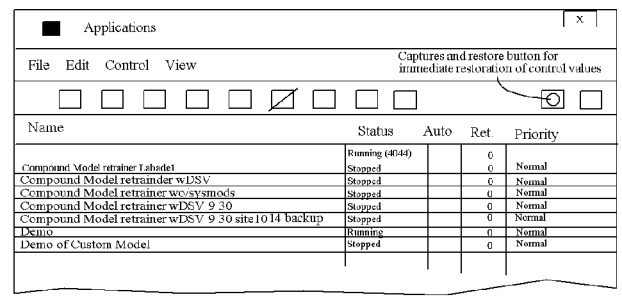

FIG. 13 shows a snapshot feature. Since the system allows on-line real-time changes to logic and models, a recovery mechanism that snapshots all values in memory is available. The snapshot records all values, triggers or other parameters affecting control system operation and creates a image of the memory. If the engineer/operator hits the restore button, the memory snapshot is restored returning the control back to the snapshot conditions.

It should be noted that typical applications of the present invention include, but are not limited to power plant control and cement plant or cement mixing control. In particular, at a cement plant or cement mixing facility, the present invention can control equipment based on actual gas flow near the process including controlling gas flow through raw mills, controlling tertiary air or primary air in coal pipes, bypass ducts, kiln exits or around a cement mill loop, in particular controlling ball mills.

In a power plant, the present invention can be used for controlling equipment at a power plant facility based on air, fuel and other process parameters such as temperatures, concentrations numerous other power plan parameters for controlling NOx generated by a combustion process or LOI (Loss of Ignition) or CIA (Carbon in Ash) generated by a combustion process. The present invention can also be used to control generated CO and emitted Hg or the type of Hg species emitted. In addition, efficiency of the combustion process in relation to MW produced can also be controlled.

The present invention can be used at a power plant based on air, fuel and other process parameters such as temperatures and pressures to control distribution or amount of parameters like O2, NOx, CO, LOI, CIA and heat generated by the combustion process affecting performance of a Selective Catalytic Reduction system or a Non-Catalytic Reduction System or effectiveness of dust/ash collection of a baghouse and the aging/deterioration rate of material in the baghouse collectors.

The present invention can also be used at a power plant to allow the ability to control equipment based on time between blowing events and duration of blowing events of water and/or steam injection and/or air injection from sootblowers including water injection temperature, air injection temperature, water injection pressure, air injection pressure for purposes of cleaning a boiler surface along with the path or surface designated to be cleaned with resulting impact on combustion products such as NOx, CO, LOI, CIA and heat. distribution). It is also useful to control equipment that permits blending of fuel to optimize resulting emission profiles for NOx, CO, LOI or CIA.

Several descriptions and illustrations have been presented to aid in understanding the present invention. One with skill in the art will understand that numerous changes and variations are possible without departing from the spirit of the invention. Each of these changes and variations is within the scope of the present invention.

I claim:

1. A method of generating a modeling system and supervisory control system for a real-time industrial control process comprising:
   providing capability to define inputs from said real-time industrial control process;
   providing capability to define control points into said real-time industrial control process;
   providing capability to define a plurality of program threads in a modeling application driving said real-time industrial control process, each program thread defining a starting component of an associated logic stream and being assigned a sequence number representing an order in which the logic stream starts;
   providing capability to define a plurality of models usable by said modeling application;
   providing capability to use artificial intelligence tools in at least some of said plurality of models;
   providing a plurality of programming objects capable of being graphically and operatively linked together by a user to form one or more logic streams having a user-defined operating flow, at least a portion of the programming objects being further capable of dynamically displaying intermediate and final results, each of said programming objects capable of being associated with any number of said plurality of program threads;
   providing a user-selectable snapshot feature for recording a plurality of active variables at a given time in said real-time industrial control process;
   providing capability to restore said real-time industrial control process based on the variables recorded in response to user-selection of said snapshot feature;
   providing one or more user-selectable options to modify, save, and refresh a file, wherein user selection of the refresh option causes real-time updates to all logic and calculated values relating to that file on a next scheduled execution cycle, with resulting changes in control parameters.

2. The method of claim 1 wherein said real-time industrial process control is a power plant or cement plant.

3. The method of claim 1 further comprising providing data links which permit any number and type of data links to be defined and used with said modeling application.

4. The method of claim 1 further comprising allowing a plurality of modeling applications to run simultaneously.

5. The method of claim 4 further comprising providing capability to independently start or stop each of said modeling applications.

6. The method of claim 1 further comprising controlling equipment at a cement mixing facility based on actual gas flow in the real-time industrial control process including controlling gas flow through raw mills, controlling tertiary air or primary air in coal pipes, bypass ducts, kiln exits or ball mills.

7. The method of claim 1 further comprising controlling equipment at a power plant facility based on air, fuel and other process parameters including temperatures and pressures for controlling oxides of nitrogen generated by a combustion process.

8. The method of claim 1 further comprising controlling equipment at a power plant facility based on air, fuel and other process parameters including temperatures and pressures for controlling LOI (Loss of Ignition) or CIA (Carbon in Ash) generated by a combustion process.

9. The method of claim 1 further comprising controlling equipment at a power plant facility based on air, fuel and other process parameters including temperatures and pressures for controlling generated carbon monoxide.

10. The method of claim 1 further comprising controlling equipment at a power plant facility based on air, fuel and other process parameters including temperatures and pressures for controlling emitted mercury species.

11. The method of claim 1 further comprising controlling equipment at a power plant facility based on air, fuel and other process parameters including temperatures and pressures for controlling heat loss and efficiency of a combustion process.

12. The method of claim 1 further comprising controlling equipment at a power plant facility based on air, fuel and other process parameters including temperatures and pressures to control distribution or amount of parameters of oxygen, carbon monoxide, oxides of nitrogen, LOI, CIA and heat generated by a combustion process affecting performance of a Selective Catalytic Reduction system or a NonCatalytic Reduction System.

13. The method of claim 1 further comprising the ability to control equipment at a power plant facility based on air, fuel and other process parameters including temperatures and pressures for purposes of controlling distribution and amount of one or more parameters of oxygen, carbon monoxide, oxides of nitrogen, LOI, CIA and heat generated by a combustion process as it interacts with S02 injection to affect performance of a precipitator.

14. The method of claim 1 further comprising an ability to control equipment at a power plant facility based on air, fuel and other process parameter for purposes of controlling distribution and amount of one or more parameters of oxygen, carbon monoxide, oxides of nitrogen, LOI, CIA and heat (temperature and pressure distribution) generated by a combustion process as it impacts effectiveness of dust/ash collection of a baghouse and aging/deterioration rate of material in bag house collectors.

15. The method of claim 1 further comprising an ability to control equipment at a power plant facility based on time between blowing events and duration of blowing events of water and/or steam injection and/or air injection from sootblowers including water injection temperature, air injection temperature, water injection pressure, air injection pressure for purposes of cleaning a boiler surface along with a path or surface designated to be cleaned with resulting impact on combustion products including carbon monoxide, oxides of nitrogen, LOI, CIA and heat distribution.

16. The method of claim 1 comprising an ability to control equipment at a power plant facility that permits blending of fuel to optimize resulting emission profiles for NOx, CO, carbon monoxide, oxides of nitrogen, LOI, CIA.

17. A method of generating a modeling system and real-time supervisory control system for a power plant with a combustion process comprising:
   providing capability to define inputs from said power plant including temperatures and pressures as well as oxides of nitrogen;
   providing capability to define control points into said combustion process;
   providing capability to define a plurality of program threads in a modeling application driving said combustion process, each program thread defining a starting component of an associated logic stream and being assigned a sequence number representing an order in which the logic stream starts;
   providing capability to define a plurality of models usable by said modeling application;
   providing capability to use artificial intelligence tools in at least some of said plurality of models;
   providing plurality of programming objects capable of being graphically and operatively linked together to form one or more logic streams having a user-defined operating flow, the programming objects being further capable of dynamically displaying intermediate and final results, each of said programming objects capable of being associated with any number of said plurality of program threads;
   providing a user-selectable snapshot feature for recording a plurality of active variables at a given time in said real-time supervisory control system;
   providing capability to restore said real-time supervisory control system based on the variables recorded in response to user-selection of said snapshot feature;
   providing one or more user-selectable options to modify, save, and refresh a file, wherein user selection of the refresh option causes real-time updates to all logic and calculated values relating to that file on a next scheduled execution cycle, with resulting changes in control parameters to said combustion process.

18. The method of claim 17 wherein said inputs also include oxygen, carbon monoxide, LOI, CIA and heat.

* * * * *